(12) United States Patent
Marceno et al.

(10) Patent No.: US 9,334,790 B2
(45) Date of Patent: May 10, 2016

(54) SYSTEM AND METHOD FOR DISCHARGING LIQUID OUT OF AN INTAKE TRACT OF A TURBOCHARGER ARRANGEMENT

(71) Applicant: Ford Global Technologies, LLC, Dearborn, MI (US)

(72) Inventors: Marco Marceno, Hagen (DE); Jan Linsel, Cologne (DE); Kay Hohenboeken, Cologne (DE); Bernd Schumacher, Langenfeld (DE); Klemens Grieser, Langenfeld (DE)

(73) Assignee: Ford Global Technologies, LLC, Dearborn, MI (US)

( * ) Notice: Subject to any disclaimer, the term of this patent is extended or adjusted under 35 U.S.C. 154(b) by 345 days.

(21) Appl. No.: 14/011,645

(22) Filed: Aug. 27, 2013

(65) Prior Publication Data

US 2014/0083398 A1 Mar. 27, 2014

(30) Foreign Application Priority Data

Sep. 21, 2012 (DE) .......................... 10 2012 216 971

(51) Int. Cl.

| | |
|---|---|
| *F02B 29/04* | (2006.01) |
| *F02M 25/07* | (2006.01) |
| *F28F 17/00* | (2006.01) |
| *F02B 29/06* | (2006.01) |

(52) U.S. Cl.
CPC .............. *F02B 29/04* (2013.01); *F02B 29/0468* (2013.01); *F02M 25/0704* (2013.01); *F28F 17/005* (2013.01); *Y02T 10/146* (2013.01)

(58) Field of Classification Search
CPC ..... F02B 29/04; F02B 29/0468; F02F 17/005
USPC ......... 123/563, 542, 559.1, 568.12; 60/605.1, 60/599, 280
See application file for complete search history.

(56) References Cited

U.S. PATENT DOCUMENTS

| | | | |
|---|---|---|---|
| 4,962,745 A | * | 10/1990 | Ohno ..................... F01M 11/08 123/533 |
| 6,527,821 B2 | | 3/2003 | Liu et al. |
| 7,980,076 B2 | | 7/2011 | Buia et al. |
| 8,061,135 B2 | | 11/2011 | Rutherford |
| 2002/0092424 A1 | | 7/2002 | Liu et al. |
| 2007/0107425 A1 | | 5/2007 | Appleton |
| 2008/0028757 A1 | | 2/2008 | Eitel et al. |
| 2009/0223493 A1 | | 9/2009 | Rutherford |
| 2010/0229549 A1 | | 9/2010 | Taylor |
| 2011/0088663 A1 | | 4/2011 | Dehnen et al. |
| 2011/0094219 A1 | | 4/2011 | Palm |
| 2013/0067913 A1 | * | 3/2013 | Nishio ................... F02M 33/04 60/599 |

FOREIGN PATENT DOCUMENTS

| | | |
|---|---|---|
| DE | 3817770 A1 | 11/1989 |
| DE | 19714308 A1 | 10/1998 |

(Continued)

*Primary Examiner* — Mahmoud Gimie
(74) *Attorney, Agent, or Firm* — Julia Voutyras; Alleman Hall McCoy Russell & Tuttle LLP

(57) ABSTRACT

The invention relates to a method for discharging liquid from an intake tract of a turbocharger arrangement including a charge air cooler. As such, a charge air cooler may include a liquid collector including a switchable valve downstream of a charge air cooler. The switchable valve may be adjusted following the determination of an opening frequency and an opening duration based on a liquid collector temperature and a liquid collector pressure.

18 Claims, 10 Drawing Sheets

(56) References Cited

FOREIGN PATENT DOCUMENTS

| DE | 102006053191 A1 | 5/2007 |
|----|-----------------|--------|
| DE | 102009042981 A1 | 4/2010 |
| EP | 1010889 A2 | 6/2000 |
| EP | 1170478 A2 | 1/2002 |
| FR | 2919349 A3 | 1/2009 |
| WO | 2006045488 A1 | 5/2006 |
| WO | 2009056197 A1 | 5/2009 |

* cited by examiner

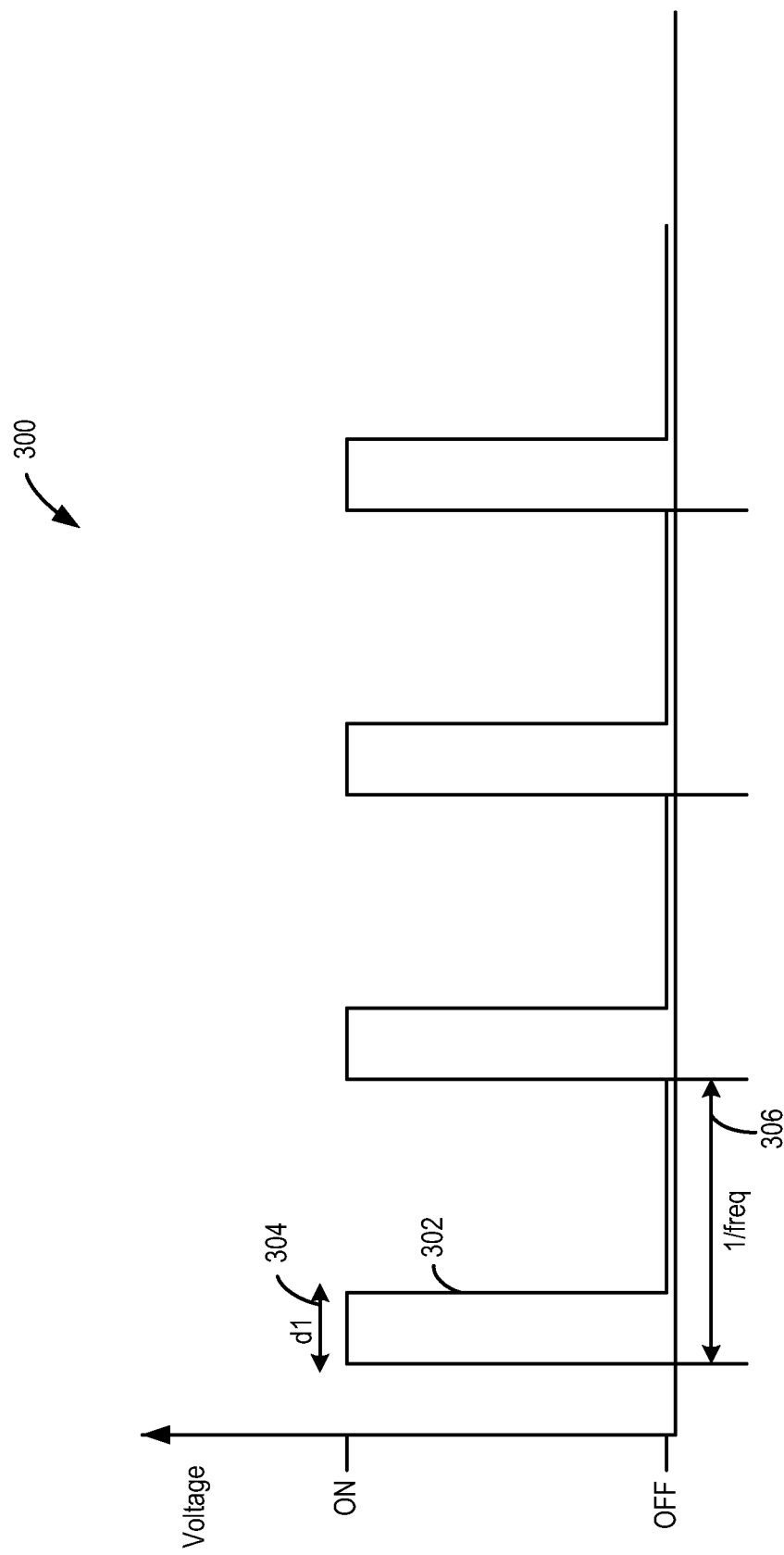

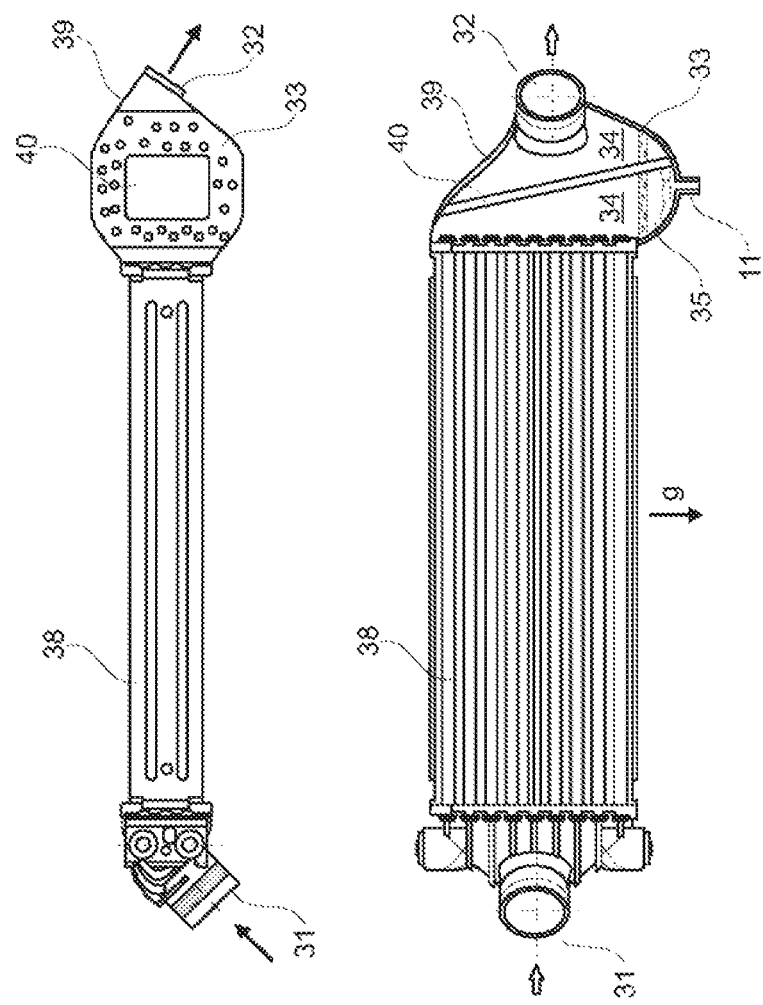

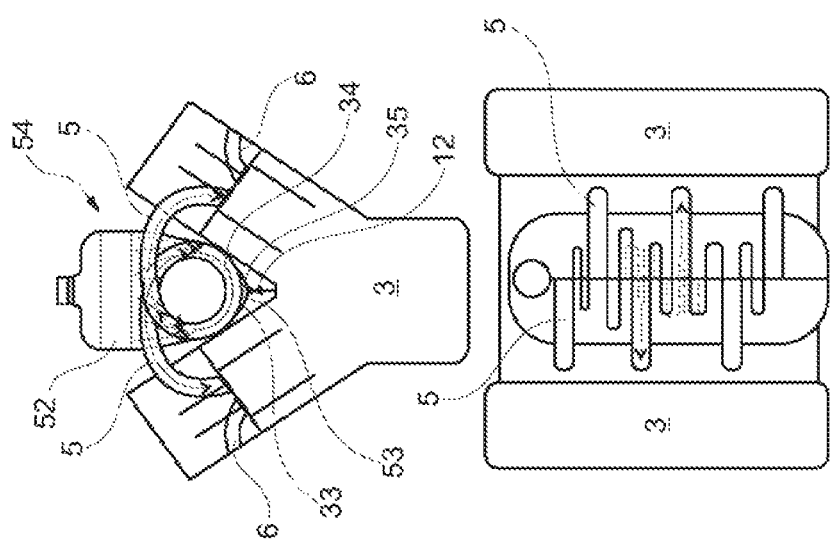

SYSTEM AND METHOD FOR DISCHARGING LIQUID OUT OF AN INTAKE TRACT OF A TURBOCHARGER ARRANGEMENT

RELATED APPLICATIONS

The present application claims priority to German Patent Application No. 102012216971.7, filed on Sep. 21, 2012, the entire contents of which are hereby incorporated by reference for all purposes.

FIELD

The present invention relates to a method for discharging liquid from an intake tract of a turbocharger arrangement having an internal combustion engine, which can be supercharged by means of at least one turbocharger, and having a charge-air-cooler which is arranged in the intake tract between the turbocharger and the internal combustion engine.

BACKGROUND AND SUMMARY

Recent tests have shown that, in internal combustion engines, in particular gasoline or Otto-cycle engines, a significant fraction of the exhaust-gas particles generated and emitted by such engines arises from oil contained in the intake air, for example in the form of oil droplets or oil vapors. The amounts of oil contained in the intake air are caused by leakage losses from components arranged in or connected to the intake tract of the internal combustion engine, such as for example a turbocharger or crankcase ventilation or inlet valve arrangements. The oil in the intake air may easily lead to a particle emissions level close to the limit values of future exhaust-gas standards. To adhere to said exhaust-gas standards, it is therefore desirable to reduce the oil content in the intake air as far as possible in order to be able to dispense with the use of expensive particle filter units in the exhaust-gas tract of the internal combustion engine.

It is known that, during the cooling of the air or of the air mixture in the charge-air-cooler, moisture (e.g. water) can condense out of the intake air. Additionally, the moisture can be discharged from the charge-air-cooler after being condensed out.

For example, U.S. Pat. No. 8,061,135 discloses a condensate discharge arrangement for discharging condensate from the interior of a charge-air-cooler of a turbocharger arrangement for an internal combustion engine. A first end of a hose element is connected in fluid-conducting fashion to a downstream end of the charge-air-cooler, the second end of which hose element is connected in fluid-conducting fashion directly, bypassing a throttle flap, to an intake manifold of the internal combustion engine. The hose element removes condensate from the charge-air-cooler continuously in reaction to a pressure gradient generated by the throttle flap when the internal combustion engine is in an activated state.

The inventors herein have recognized the above issues as well as issues with approaches such as described in U.S. Pat. No. 8,061,135. For example, a vessel for collecting the condensate, specifically oil droplets, at the charge-air-cooler is not present. Further, the use of a hose element to remove condensate may consume engine space.

In one example, some of the above issues may be addressed by a method for discharging liquid from an intake tract of a turbocharger arrangement comprising, collecting the liquid in a liquid collector including a liquid outlet. As such, the liquid outlet may be closed off by a switchable valve downstream of the charge-air-cooler. The switchable valve may be adjusted following the determination of an opening frequency and an opening duration based on a liquid collector temperature and a liquid collector pressure. In this way, the technical effect is achieved that oil may be reliably discharged from an intake tract of a turbocharger arrangement, thereby decreasing emissions from a vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2B shows a graphical example of an opening duration of a liquid collector valve.

FIG. 5 shows a plan view and a side view of a charge-air-cooler including a liquid collector and an air guiding plate.

FIG. 10 shows a front view and a plan view of a charge-air-cooler including a liquid collector integrated in an intake manifold of a V-configuration engine.

DETAILED DESCRIPTION

The liquid to be discharged from the intake tract of the turbocharger arrangement by means of the method according to the invention may comprise not only water but in particular also oil. Within the context of the present invention, the intake tract may encompass any intake-air-conducting or combustion-air-conducting components of the internal combustion engine that are situated upstream of the combustion chamber or the combustion space of the internal combustion engine. According to the invention, the liquid that forms in the intake tract may be collected, downstream of the charge-air-cooler, in the liquid collector. It is thus possible for the liquid collector to intercept for example oil vapors that are condensed out in the charge-air-cooler and likewise also water that is condensed out in the charge-air-cooler. Therefore, the liquid collected in the liquid collector may be a mixture of water and oil. For the further separation of oil, which is not already condensed out in the form of oil vapors in the charge-air-cooler, out of the intake or charge air, in particular for example of oil droplets entrained in the intake air, the liquid collector may be designed such that oil droplets may be separated out of the intake air. The collection of the liquid downstream of the charge-air-cooler offers the advantage that both the liquid, such as water and oil, may be condensed out in the charge-air-cooler. Further, the oil may be separated out of the charge air by the oil separation device and may be collected in the liquid collector.

Figure 1:
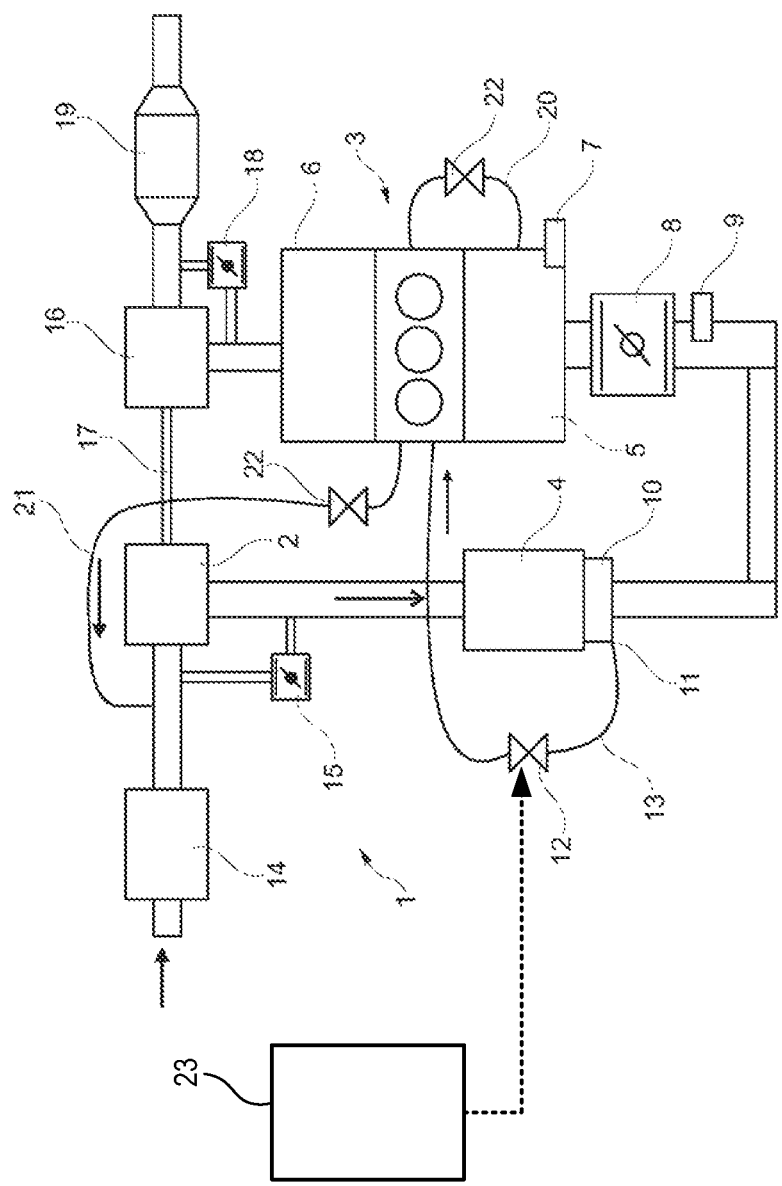
FIG. 1 shows a schematic view of an internal combustion engine system including a liquid collector.

FIG. 1 schematically shows a schematic view of an internal combustion engine system including a liquid collector. The turbocharger arrangement 1 comprises an internal combustion engine 3 that may be supercharged by means of a compressor 2, and a charge-air-cooler 4 which may be arranged in an intake tract of the internal combustion engine 3 between the compressor 2 and the internal combustion engine 3. In one example the turbocharger arrangement 1 shown in FIG. 1, the internal combustion engine 3 is an Otto-cycle engine.

The internal combustion engine 3 comprises an intake pipe or an intake manifold 5 to which the combustion-air-conducting components that form the intake tract of the internal combustion engine 3 are connected, and an exhaust manifold 6 to which the exhaust-gas-conducting components that form the exhaust-gas tract of the internal combustion engine 3 are connected. The turbocharger arrangement 1 may have an intake manifold 5 including a pressure sensor 7 for detecting the air pressure of the intake air in the intake manifold 5. A throttle flap unit 8 may be positioned in the intake tract upstream of the intake manifold 5. A charge pressure sensor 9 for detecting the charge pressure in the intake tract may be positioned upstream of the throttle flap unit 8.

Further upstream in the intake tract a liquid collector 10 may be integrated with a charge-air-cooler 4. The liquid collector 10 may collect the liquid, in particular water and oil, which may be separated out of the combustion air in the intake tract. The liquid collector 10 has a liquid outlet 11 which may be closed off by an electrically switchable valve 12 which may be controlled by means of a control device 23. Therefore, at least the water condensed in the charge-air-cooler 4 and the oil vapors condensed therein are collected in the liquid collector 10. In one example, the valve 12 may be a valve with only an open operating position and a closed operating position between which it can be switched (e.g. electrically switched).

In the exemplary turbocharger arrangement 1, the liquid collector 10 may be connected directly to the charge-air-cooler 4 in order to form a structural unit. Specifically, the charge-air-cooler 4 may include an intake air inlet at the entry side and an intake air outlet at the exit side, wherein the liquid collector 10 forms the intake air outlet of the charge-air-cooler 4. Therefore, the liquid collector 10 may be an integral part of the charge-air-cooler 4, such that the charge-air-cooler 4 and the liquid collector 10 may be particularly compact construction.

In another example, the liquid collector 10 may also be arranged in the intake tract separately from the charge-air-cooler 4. As such, the throttle flap unit 8 and the intake manifold 5, wherein in the latter case, the condensate (water and oil) generated in the charge-air-cooler 4 may be correspondingly conducted into the liquid collector 10 and collected there.

Further, the liquid outlet 11 of the liquid collector 10 may be connected in fluid-conducting fashion via a discharge line 13 to a crankcase or an oil sump of the internal combustion engine 3. When the valve 12 is open, liquid (e.g. a mixture of water and oil) may be discharged out of the liquid collector 10 into the crankcase or the oil sump of the internal combustion engine 3 via said discharge line 13, as indicated in FIG. 1 by a corresponding directional arrow on the discharge line 13. As illustrated in FIG. 1, the valve 12 may be arranged in the discharge line 13 and open and close the liquid outlet 11. In another example, valve 12 may be arranged directly at the liquid outlet 11 of the liquid collector 10.

Furthermore, compressor 2 may be situated upstream of the charge-air-cooler 4, the intake air to be compressed in the intake tract being sucked in by compressor 2 via an air filter 14 arranged upstream of the compressor 2. In one example, the downstream exit of the compressor 2 may be connected to the upstream inlet of the compressor 2 in fluid-conducting fashion via a charge pressure blow-off valve 15. Charge pressure blow-off valve 15 may discharge an excess of charge pressure in the intake tract downstream of the compressor 2, based on a sudden closure of the throttle flap unit 8, out of said portion of the intake tract to the entry side of the compressor 2.

A turbine 16 of the turbocharger arrangement 1 may be arranged in the exhaust-gas tract of the internal combustion engine 3 downstream of the exhaust manifold. The turbine 16 is driven by the exhaust gas flowing out of the exhaust manifold 6. The turbine 16, in turn, drives the compressor 2. Turbine 16 and turbocharger compressor 2 may be mechanically coupled via a shaft 17.

In the turbocharger arrangement 1, the exhaust-gas flow may be conducted past the turbine 16 by means of a wastegate or bypass valve 18, in order to be able to control the turbine rotational speed and consequently the charge pressure of the compressor 2 in the intake tract of the internal combustion engine 3. Finally, the exhaust-gas tract downstream of the turbine 16 may include a three-way catalytic converter 19 for exhaust-gas after treatment.

The turbocharger arrangement 1 may include a first crankcase vent 20 and a second crankcase vent 21 including one shut-off or check valve 22. The shut-off or check valves 22 may be designed to discharge an excess pressure in the crankcase of the internal combustion engine 3 either to the intake manifold 5 (first crankcase vent 20) or to the upstream entry side of the compressor 2 (second crankcase vent 21).

Figure 2A:
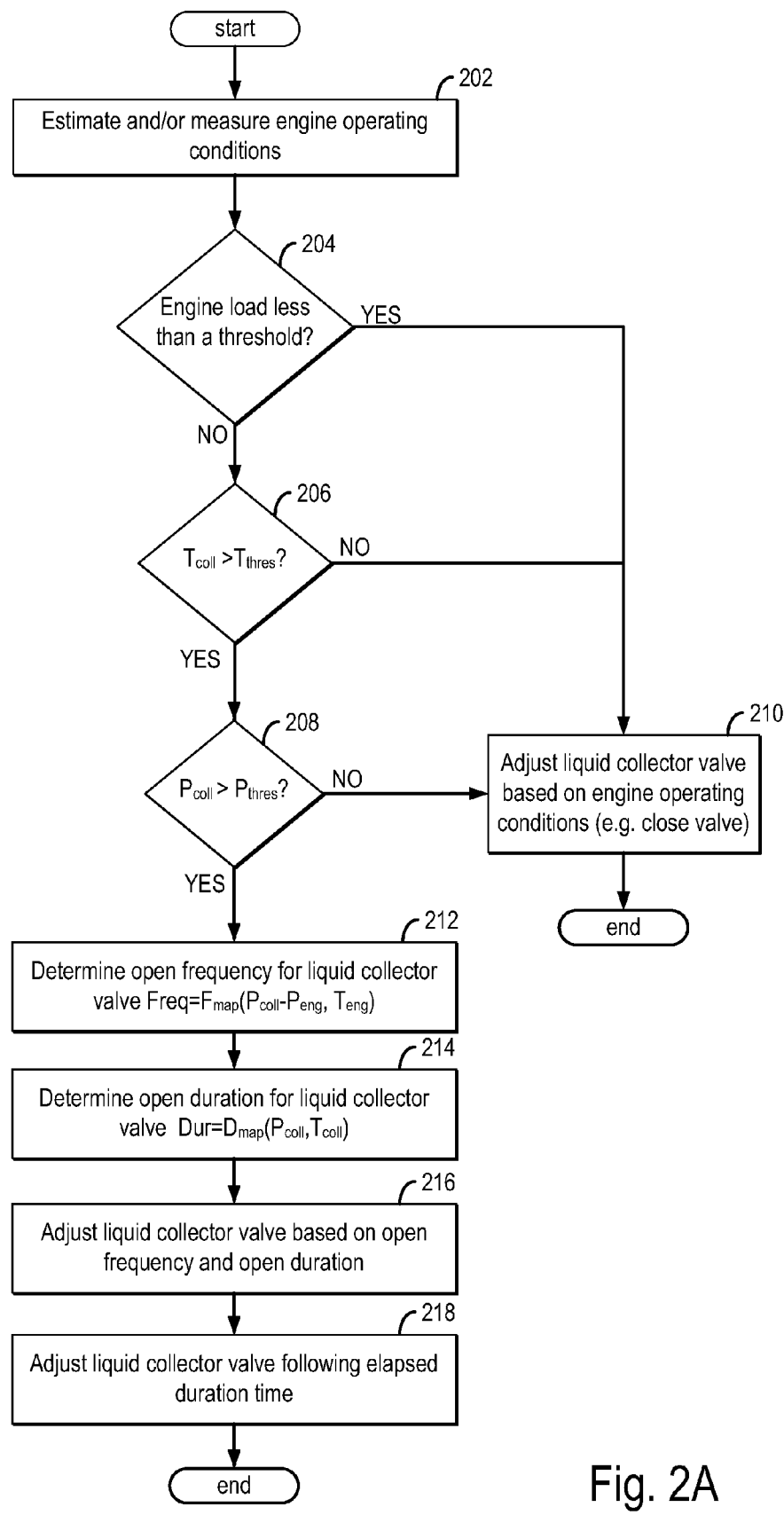
FIG. 2A shows an example method for operating a liquid collector valve.

Now referring to FIG. 2A, an example method 200 including operating a liquid collector valve is shown. According to the invention, the discharging of the liquid out of the intake tract of the turbocharger arrangement may be performed only if the temperature at the liquid collector is higher than a pre-determined temperature threshold value. Further, discharging of the liquid from the liquid collector may occur when the pressure in the liquid collector is higher than a pre-determined pressure threshold value.

At 202, the method includes estimating and/or inferring engine operating conditions. Engine operating conditions may include, for example, engine speed, engine temperature, catalyst temperature, boost level, manifold air pressure (MAP), mass air flow (MAF), ambient conditions (temperature, pressure, humidity, etc.). At 204, the method includes determining if the engine load is less than a threshold. For example, during an engine cold start the temperature of the liquid collector may be less than a threshold. As such, at 210, the liquid collector valve may be closed in order to keep the liquid contained in the liquid collector. However, if the engine load is not less than a threshold, at 206, the method includes determining if the liquid collector temperature ($T_{coll}$) is greater than a pre-determined temperature threshold value ($T_{thres}$). Since the liquid may contain oil and water, the temperature threshold value ensures that the temperature at the liquid collector may be higher than the freezing temperature of the liquid. In one example, the temperature threshold may be determined such that the outside or ambient temperature of the turbocharger arrangement is higher than the freezing temperature of the liquid. As such, the temperature threshold may prevent freezing of the liquid during discharging of the liquid from the liquid collector. In another example, the temperature threshold value may be set at a value higher than the freezing temperature of the liquid that is collected in the liquid collector. If the temperature at the liquid collector lies below the freezing temperature of the liquid, it may be possible for the valve, which closes off the liquid outlet, to freeze in its open position. If the $T_{coll}$ is not greater than $T_{thres}$, the method continues at 210 where the method includes adjusting a liquid collector valve based on engine operating conditions (e.g. engine boost). For example, the liquid collector valve may be adjusted to a closed position.

Returning to 206, if the $T_{coll}$ is greater than $T_{thres}$, at 206, the method includes determining if a pressure of the liquid collector ($P_{coll}$) is higher than a pre-determined pressure threshold value ($P_{thres}$). For example, the actual spatial arrangement of the liquid collector relative to the oil fill level in the crankcase or in the oil sump of the internal combustion engine may not include natural, gravity-induced expulsion force for expelling the liquid from the liquid collector into the crankcase or the oil sump. As such, the pressure threshold value may be determined such that the pressure in the liquid collector may be higher than the pressure in the crankcase or in the oil sump. At 208, if the $P_{coll}$ is not greater than $P_{thres}$, at 210, a liquid collector valve is adjusted based on engine operating conditions. For example, under low engine boost conditions, the pressure in the liquid collector may be less than a pressure threshold. As such, the liquid collector valve may be adjusted to a closed position in order to keep the liquid contained in the liquid collector.

Returning to 208, if the $P_{coll}$ is greater than $P_{thres}$, the method, at 212, includes determining the opening frequency (Freq) for the liquid collector valve. Once the opening frequency is determined, at 214, the opening duration is determined. In one example, the values may be determined based on a pre-determined characteristic map ($F_{map}$) for the opening frequency Freq and a pre-determined characteristic map ($D_{map}$) for the opening duration (Dur). In another example, the opening frequency (Freq) may be determined based on a pressure difference between the pressure of the liquid collector ($P_{coll}$) and a pressure of the oil sump ($P_{eng}$). In another example, the opening duration (Dur) may be determined based on the pressure of the liquid collector ($P_{coll}$) and also the temperature of the liquid collector ($T_{coll}$). As such, the respective characteristic maps $F_{map}$ and $D_{map}$ can be stored in a control device which carries out the method according to the invention.

Further, both the temperature and pressure of the liquid collector may be determined based on engine operating conditions (e.g. engine boost levels) of the turbocharger arrangement including the present charge pressure in the intake tract, the present pressure in the crankcase or in the oil sump, and the temperature of the oil in the crankcase or in the oil sump.

In another example, the determination of the opening frequency includes a determination of the opening frequency as a function of at least one pressure difference between the pressure in the liquid collector and a pressure in the crankcase or in the oil sump of the internal combustion engine and a temperature of the internal combustion engine. In this way, the determination of the opening frequency as a function of the pressure difference between the pressure in the liquid collector and the pressure in the crankcase or at the oil sump of the internal combustion engine primarily ensures that the pressure in the crankcase or at the oil sump does not increase over a threshold as a result of excessively frequent discharging of the liquid out of the liquid collector. For example, frequent discharging may occur if the pressure difference is relatively high based on a very high charge pressure in the intake tract. By contrast, in the case of a low pressure difference, the discharging process may be performed more frequently.

Further, the opening frequency may be calculated on the basis of a pre-determined mathematical function in which the above-stated parameters of pressure difference and temperature of the internal combustion engine may be used as input variables. However, the opening frequency may be determined with the aid of a pre-determined and stored characteristic map for the respective pressure difference values and temperature values.

After the opening frequency and the opening duration have been determined, at 216 the method includes adjusting the liquid collector valve based on the open frequency and open duration. As such, the liquid may be discharged from the liquid collector into the crankcase or the oil sump of the internal combustion engine via a discharge line. In one example, the determination of the frequency and duration of the valve opening ensures that the liquid collected in the liquid collector is reliably discharged from the intake tract into the crankcase or the oil sump of the internal combustion engine. Additionally, by determining the frequency and duration of the valve opening, discharging of the liquid from the liquid collector and the pressure in the crankcase or the oil sump and/or too much water collection may not increase over a pre-determined threshold. As such, the valve 12 is opened for the opening duration (Dur), and at, 218, may be subsequently closed again. The above method may be repeated such that the subsequent steps of determination, opening, discharge, and closing based on the pre-determined opening frequency.

In one example, the oil contained in the liquid and separated out of the intake air in the intake tract may be supplied back to the oil circuit of the internal combustion engine. The oil that is discharged in this way consequently cannot pass in an uncontrolled manner into the environment either via the combustion process in the internal combustion engine or by being directly discharged into the environment of the turbocharger arrangement. The method according to the invention therefore permits firstly the reliable discharge of the liquid out of the intake tract of the internal combustion engine in an environmentally compatible manner, and secondly contributes to a considerable reduction of the particle emissions of the internal combustion engine.

In another embodiment, the determination of the opening frequency as a function of the temperature of the internal combustion engine ensures that no excessive amounts of water collect in the oil circuit of the internal combustion engine. For example, the liquid may not be discharged out of the liquid collector when the temperature of the internal combustion engine is still relatively low. Additionally, the higher the temperature of the internal combustion engine and thus the oil temperature in the oil circuit of the internal combustion engine, the faster the water contained in the liquid can evaporate after the liquid has been discharged into the crankcase or the oil sump, and the more frequently the liquid can be discharged into the crankcase or the oil sump.

In another embodiment, the determination of the opening duration comprises a determination of the opening duration as a function of at least the pressure in the liquid collector and the temperature at the liquid collector. In this case, the determination of the opening duration may be calculated on the basis of a pre-determined mathematical function in which at least the parameters of pressure in the liquid collector and temperature at the liquid collector may be used as input variables. The opening duration may be determined based on a predetermined and stored characteristic map for the respective pressure values and temperature values.

In another embodiment, the temperature at the liquid collector may be determined by detecting the ambient temperature including an ambient temperature sensor. For example, the temperature at the liquid collector may be determined by modeling the liquid temperature in the liquid collector. The liquid temperature in the liquid collector may be modeled based on the ambient temperature and/or the present operating state of the turbocharger arrangement including the charge pressure in the intake tract, and/or the temperature of the intake air after it flows through the charge-air-cooler. Alternatively, the liquid temperature in the liquid collector may also be determined based on a separate temperature sensor in the liquid collector. The determination of the temperature at the liquid collector may be used to prevent the discharging of the liquid out of the liquid collector if the temperature is close to the freezing temperature of the liquid.

In yet another embodiment, the liquid level in the liquid collector may be detected based on a liquid level sensor. As such, the opening frequency may be calculated additionally as a function of the detected liquid level. For this purpose, the liquid level sensor may be positioned in the liquid collector. Through adaptation of the opening frequency to the actual liquid level in the liquid collector, the method for discharging the liquid out of the intake tract of the turbocharger arrangement may be optimized significantly, for example by virtue of the valve being opened only when a certain amount of liquid has actually collected in the liquid collector, and/or by virtue of the valve being opened more frequently only in those operating states of the turbocharger arrangement in which a relatively large amount of liquid is separated out of the intake air in the intake tract.

To be able to carry out the method according to the invention without risk even at ambient temperatures close to the freezing temperature of the liquid, a further embodiment of the invention provides that the liquid collector and/or the valve and/or the discharge line are heated if the temperature at the liquid collector is below the pre-determined temperature threshold value. For this purpose, it is furthermore provided that the heating is performed electrically or alternatively by means of a coolant circulating in a coolant arrangement for cooling the internal combustion engine.

In situations in which the liquid collector is, in relation to gravity, arranged above an inlet point of the discharge line into the crankcase or into the oil sump of the internal combustion engine, it is provided according to yet another advantageous refinement of the invention that the valve is open for a pre-determined opening duration even after the shut-down of the internal combustion engine, such that the liquid in the liquid collector can be discharged out of the liquid collector exclusively under the action of gravity. As such, the liquid collector can be completely emptied after the shut-down of the internal combustion engine.

According to a further embodiment of the present invention, a turbocharger arrangement for carrying out the method according to the invention described herein for discharging liquid out of an intake tract of the turbocharger arrangement has an internal combustion engine which can be supercharged, via an intake-air-conducting intake tract, by means of at least one turbocharger and which has a crankcase and/or an oil sump, and said turbocharger arrangement has a charge-air-cooler arranged in the intake tract between the turbocharger and the internal combustion engine. Furthermore, a liquid collector for collecting liquid present in the intake tract and/or in the intake air is provided in the intake tract downstream of the charge-air-cooler. The liquid collector has a liquid outlet which can be closed off by means of a switchable, in particular electrically switchable valve, and said liquid outlet can be connected in fluid-conducting fashion to the crankcase and/or to the oil sump of the internal combustion engine.

As described above with regard to FIG. 2, a method for discharging liquid from an intake tract of a turbocharger arrangement comprises, the intake tract encompassing any intake-air-conducting or combustion-air-conducting components of the internal combustion engine that are situated upstream of the combustion chamber or the combustion space of the internal combustion engine. By means of the arrangement according to the invention of the liquid collector downstream of the charge-air-cooler, the liquid that forms in the intake tract upstream of the liquid collector can be collected in the liquid collector. It is thus possible for the liquid collector to intercept, for example, oil vapors and/or water that may be condensed out in the charge-air-cooler. Accordingly, the liquid that is collected in the liquid collector is generally a mixture of water and oil. The fluid-conducting connection, that can be produced by means of the switchable valve, between the liquid outlet of the liquid collector and the crankcase and/or the oil sump of the internal combustion engine permits a reliable and environmentally compatible supply of the oil that is contained in the intake air and that is separated out in the intake tract back into the oil circuit of the internal combustion engine. The oil that is discharged in this way consequently cannot pass in an uncontrolled manner into the environment either by being directly discharged into the environment of the turbocharger arrangement or via the combustion process in the internal combustion engine. The turbocharger arrangement according to the invention thus contributes inter alia to a considerable reduction of the particle emissions of the internal combustion engine.

Now referring to FIG. 2B, an example graph 300 of an opening duration of a liquid collector outlet valve is shown. As such, a liquid collector outlet valve of the liquid collector may be adjusted based on a pressure difference from the liquid collector and a pressure of the oil sump. Further, the collector may be adjusted based on the pressure of the liquid collector and the temperature of the liquid collector, as described above with regard to FIG. 2A. In this way, the open frequency and duration of the liquid collector outlet valve may be determined only if both the temperature and pressure conditions are satisfied concurrently.

Graph 300 shows an example adjustment of a liquid collector valve including valve positioning (e.g. open or closed) on the y-axis and frequency on the x-axis. In one example, the liquid collector valve may be an electrically switchable valve. Discharging liquid from a liquid collector may include a liquid collector outlet valve, such that the liquid collector outlet valve may be responsive to an inter-related temperature and pressure at the collector. In one example, discharging the liquid includes a pulse-width modulating the liquid outlet valve of the collector into a crankcase or oil sump of the engine. Adjusting the liquid collector outlet valve at an opening duration and frequency may be referred to as a pulse-width-modulation (PWM). As such, adjusting the liquid collector valve may include a duty cycle of a liquid collector valve comprising a pulse 302 with a pulse-width 304 delivered based on a frequency 306. Further, a frequency and pulse-width of the modulation may be responsive to a pressure difference from the intake to the crankcase or sump. For example, the open frequency may be increased when the pressure difference increases, such that the pressure difference may be a pressure ($P_{coll}$) in the liquid collector and a pressure ($P_{eng}$) in the crankcase or in the oil sump. Further, the open frequency of the liquid collector valve may be increased when the temperature of the liquid collector increases. As such, the pulse-width opening duration may increase as pressure in the liquid collector increases and the temperature at the liquid collector increases. For example, based on the pressure and temperature of the liquid collector, the PWM in graph 300 may include a pulse-width 304 with an open duration d1 and frequency 306. In this example, the pulse-width comprises a 25% duty cycle. In another example, if the pressure and temperature of a liquid collector continue to increase, the pulse-width duration d1 and frequency may also increase resulting in an increase in duty cycle. Additionally, continuing the modulating of the pulse-width may occur even after a shut-down of the engine that may be responsive to a road grade. In another example, adjusting the open frequency may be based on a liquid level of the liquid collector. Additionally, if the temperature at the liquid collector falls below a threshold, increasing the temperature of the liquid may include heating the liquid collector.

In this way, the method comprises, collecting liquid in an engine intake collector downstream of a charge-air-cooler. Further, a method comprising a liquid collector outlet valve that may be responsive to an inter-related temperature and pressure at the collector, pulse-width modulating a liquid outlet valve of the collector into a crankcase or oil sump of the engine, a frequency and pulse-width of the modulation adjusted responsive to a pressure difference form the intake to the crankcase or sump.

Figure 3:
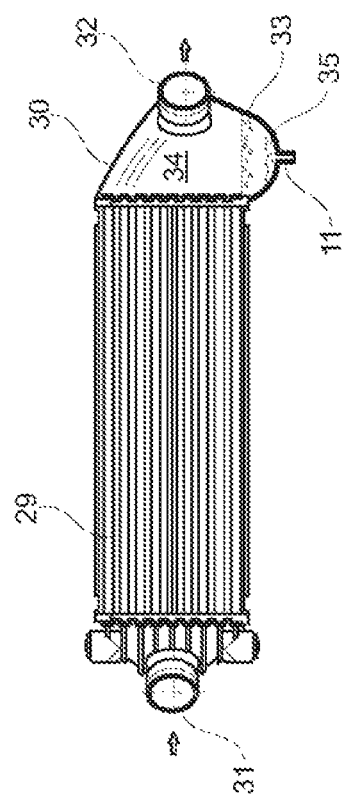
FIG. 3 shows a schematic view of a charge-air-cooler including a liquid collector.

Now referring to FIG. 3, a side view of a charge-air-cooler with a liquid collector a turbocharger arrangement is shown, with regard to FIG. 1. The turbocharger arrangement shown in FIG. 3 differs from the turbocharger arrangement illustrated in FIG. 1 based on the charge-air-cooler 29 and the liquid collector 30. As can be seen from FIG. 3, the charge-air-cooler 29 has an intake air inlet 31 and an intake air outlet 32, wherein the liquid collector 30 is positioned such that the arrangement may be a compact. The liquid collector 30 forms a structural unit with the charge-air-cooler 29. The flow direction of the intake air through the charge-air-cooler 29 and the liquid collector 30 is indicated by corresponding arrows at the intake air inlet 31 and at the intake air outlet 32. In the example shown in FIG. 3, the intake air correspondingly flows through the charge-air-cooler 29 and the liquid collector 30 from left to right.

FIG. 3 also shows a partition 33 in the liquid collector 30. The partition may divide the liquid collector 30 into a first volume 34, which substantially conducts the intake air flow, and a second volume 35, which substantially collects the liquid. In one example, the partition 33 may include a plurality of passage openings, such that the liquid (e.g. water and oil) condensed out in the charge-air-cooler 29 may pass firstly into the liquid collector 30, in particular into the first volume 34 of the liquid collector 30, and subsequently pass into the second volume 35 through the passage openings of the partition 33 under the action of gravitational acceleration (g) indicated in FIG. 3. The partition 33 ensures substantially that the liquid that collects in the second volume 35 is not forced out of the liquid collector 30 again by the intake air flow. As can also be seen from FIG. 3, the inlet opening and the outlet opening (corresponds to the intake air outlet 32) for the intake air into and out of the liquid collector 30 are arranged in the first volume 34 of the liquid collector 30.

For a compact, installation-space-saving turbocharger arrangement, one advantageous refinement of the invention provides that the charge-air-cooler has an intake air inlet and an intake air outlet. As such, the liquid collector forms the intake air outlet of the charge-air-cooler and forms a structural unit with the charge-air-cooler. The liquid collector is thus, in an operationally ready state, an integral constituent part of the charge-air-cooler. The charge-air-cooler equipped with the liquid collector, and the liquid collector itself, can thus be of particularly compact construction.

In another embodiment, the liquid collector may be divided into a first volume, which conducts the intake air flow, and a second volume, which collects the liquid, by means of a partition, wherein the partition has at least one, preferably a plurality of passage openings. The partition ensures that the liquid that collects in the second volume is not forced out of the liquid collector again by the intake air flow. The inlet and outlet openings for the intake air into and out of the liquid collector may be arranged in the first volume, such that the liquid that may be condensed out in the charge-air-cooler can flow through the inlet opening into the liquid collector. Therefore, the liquid may flow unhindered from the first volume into the second volume, and remain there, through the at least one passage opening in the partition.

Figure 4:
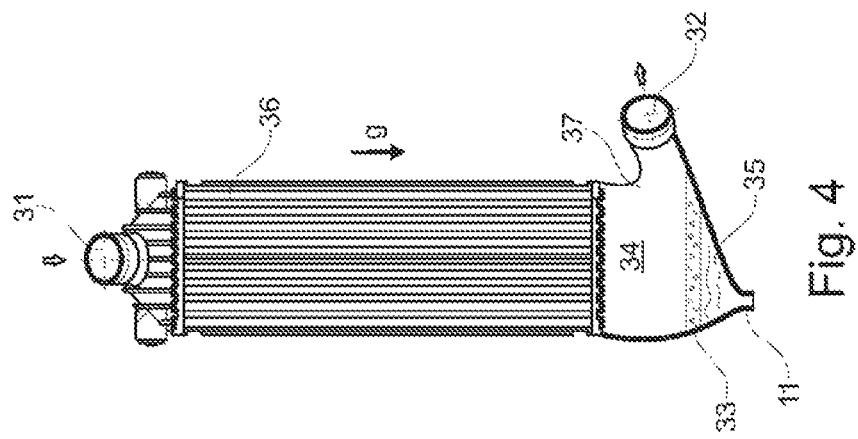
FIG. 4 shows a side view of a charge-air-cooler including a liquid collector.

FIG. 4 shows a side view of a charge-air-cooler including a liquid collector of a turbocharger arrangement. Furthermore, the charge-air-cooler 36 with the liquid collector 37 differs from the charge-air-cooler 29 with the liquid collector 30, as illustrated in FIG. 3, based on the installation position. Whereas the charge-air-cooler 29 illustrated in FIG. 3 is, as shown, arranged horizontally in the turbocharger arrangement, the charge-air-cooler 36 illustrated in FIG. 4 has a vertical installation position in the turbocharger arrangement. As a result of the vertical installation position of the charge-air-cooler 36 and the configuration of the liquid collector 37 with a laterally arranged intake air outlet 32, the flow direction of the intake air in the liquid collector 37 may be diverted before emerging from the intake air outlet 32. This offers the additional advantage of the vertical arrangement over the horizontal arrangement that liquid droplets (e.g. water and oil droplets) which are entrained in the intake air flow and which have not already been deposited in the charge-air-cooler 36, may be deposited on said partition based on the centrifugal force acting on the liquid droplets during the diversion of the intake air flow in the vicinity of partition 33. Subsequently, the liquid droplets may collect in the second volume 35 of the liquid collector 37 in addition to the liquid vapors condensed out in the charge-air-cooler 36. Furthermore, the vertical arrangement of the charge-air-cooler 36 may facilitate the transport of the liquid, which may be condensed out therein, into the liquid collector 37 under the action of gravitational acceleration (g).

FIG. 5A shows a plan view (upper view) and FIG. 5B shows a side view (lower view) of a charge-air-cooler 38 with a liquid collector 39 of a turbocharger arrangement according to the invention. The turbocharger arrangement differs from the turbocharger arrangement 1 based on the charge-air-cooler 38 and the liquid collector 39. The charge-air-cooler 38 and the liquid collector 39 differ further from the charge-air-cooler 29 and the liquid collector 30 illustrated in FIG. 3 based on the liquid collector 39 additionally has an air-guiding element 40 such as an air-guiding plate. Here, the air-guiding element 40 may be arranged and formed within the liquid collector 39 in such a way that the flow direction of the intake air flowing through the liquid collector 39 may be diverted at least once within the liquid collector 39 before exiting the intake air outlet 32. In this way, the separation of liquid droplets (e.g. water and/or oil droplets), entrained in the intake air may be further improved. As such, the liquid droplets, which have not yet been deposited in the charge-air-cooler 38, may be deposited in the liquid collector 39 on the air-guiding element 40, on the housing inner wall of the liquid collector 39 or on the partition 33, and collect in the second volume 35.

To further improve the separation of liquid droplets, in particular of oil in the form of oil droplets entrained in the intake air, which have not yet been deposited in the charge-air-cooler, it is provided according to a further advantageous refinement of the invention that the liquid collector has at least one air-guiding element. In one example, the air-guiding element may be in the form of an air-guiding plate. Here, the air-guiding element may be arranged and formed within the liquid collector in such a way that the flow direction of the intake air flowing through the liquid collector between an inlet opening and an outlet opening of the liquid collector is diverted at least once within the liquid collector. In this way, the liquid droplets entrained in the intake air may be deposited on the air-guiding element itself or on the housing inner wall of the liquid collector. Further, the liquid droplets may be collected in the liquid collector, owing to the centrifugal or inertial forces which act on said liquid droplets during the diversion of the flow direction of the intake air.

Figure 6:
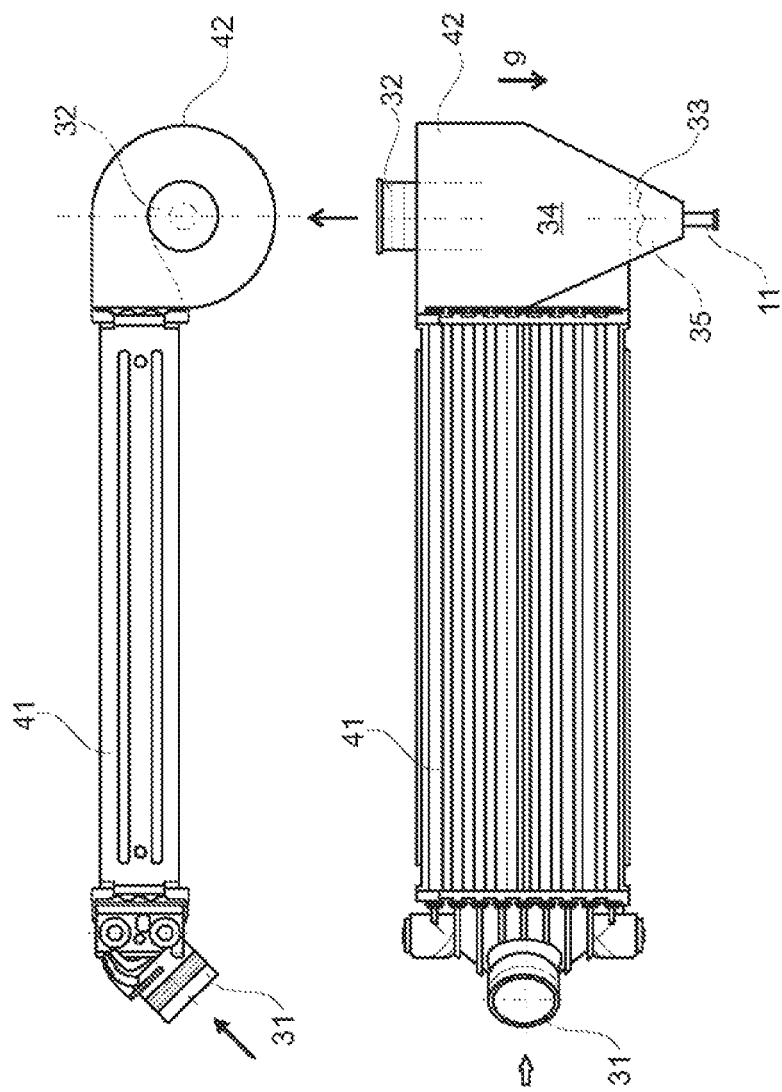
FIG. 6 shows a plan view and a side view of a charge-air-cooler including a cyclone separator liquid collector.

FIG. 6 shows a plan view (upper view) and a side view (lower view) of a charge-air-cooler 41 including a liquid collector 42 of a turbocharger arrangement which turbocharger arrangement differs from the turbocharger arrangement 1 illustrated in FIG. 1 merely by the charge-air-cooler 41 and the liquid collector 42. The charge-air-cooler 41 and the liquid collector 42 differ further from the charge-air-cooler 29 and the liquid collector 30 illustrated in FIG. 3 such that the liquid collector 42 illustrated in FIG. 6 is in the form of a centrifugal-force or cyclone separator. In this way, liquid droplets entrained in the intake air may be separated out in the liquid collector 42 even more effectively than in the case of the embodiment shown in FIG. 5. As in the cases of FIGS. 3, 4 and 5 already described above, the liquid collector 42 is divided by the partition 33 into an upper, first volume 34, which may conduct the intake air, and a lower, second volume 35, in which the liquid collects.

To yet further improve the separation of liquid droplets, in particular of oil in the form of oil droplets entrained in the intake air, which have not been deposited in the charge-air-cooler, a further advantageous refinement of the invention provides that the liquid collector is in the form of a centrifugal-force or cyclone separator.

Figure 7:
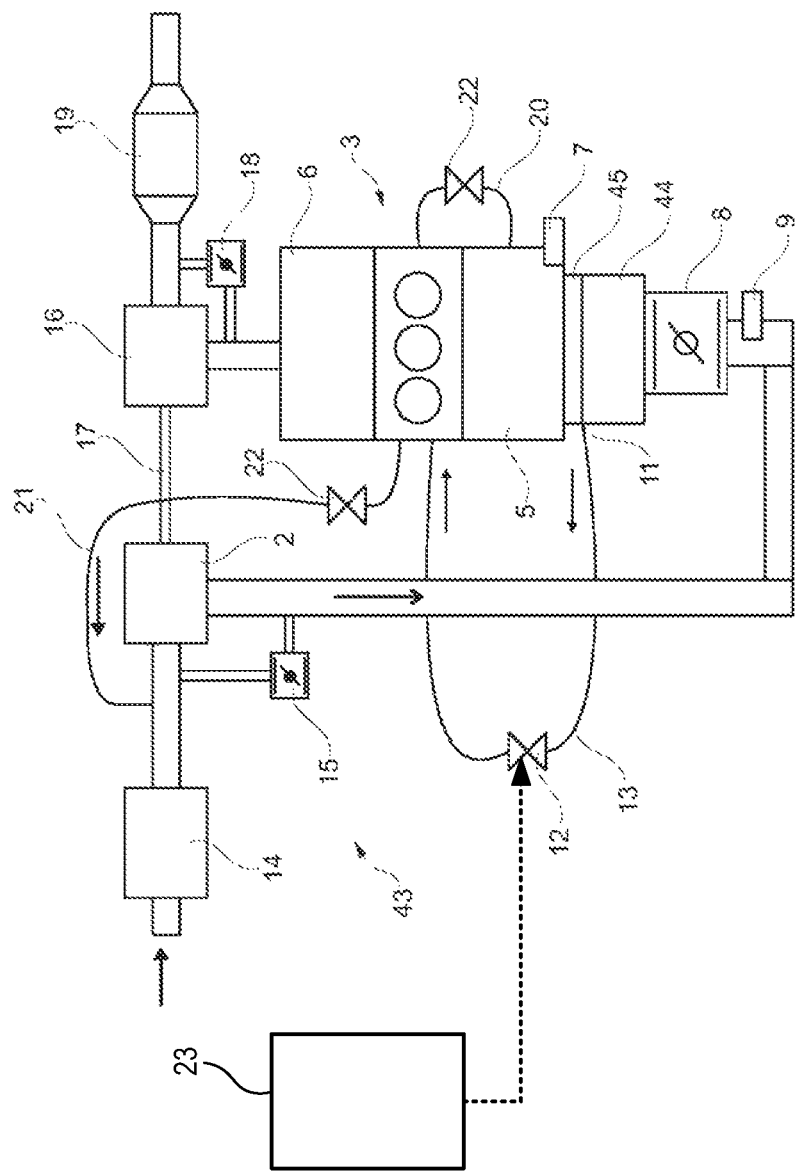
FIG. 7 shows a schematic view of an internal combustion engine system including a liquid collector integrated in an intake manifold.

FIG. 7 illustrates a schematic view of a turbocharger arrangement 43 according to the invention for carrying out the method according to the invention. The turbocharger arrangement 43 differs from the turbocharger arrangement 1 illustrated in FIG. 1 substantially in that a charge-air-cooler 44 and a liquid collector 45 are integrated in the intake manifold 5 or in the intake pipe downstream of the throttle flap unit 8, that is to say form a structural unit with the intake manifold 5, whereby a turbocharger arrangement 43 of even more compact construction can be attained. The charge-air-cooler 44 is preferably a water-cooled charge-air-cooler.

In yet another embodiment, the internal combustion engine has an intake pipe or an intake manifold in which the charge-air-cooler and the liquid collector are integrated. The charge-air-cooler and the liquid collector thus form a structural unit with the intake pipe or the intake manifold of the internal combustion engine. A turbocharger arrangement of even more compact construction is attained in this way. In this design variant, the charge-air-cooler is preferably a water-cooled charge-air-cooler.

Figure 8:
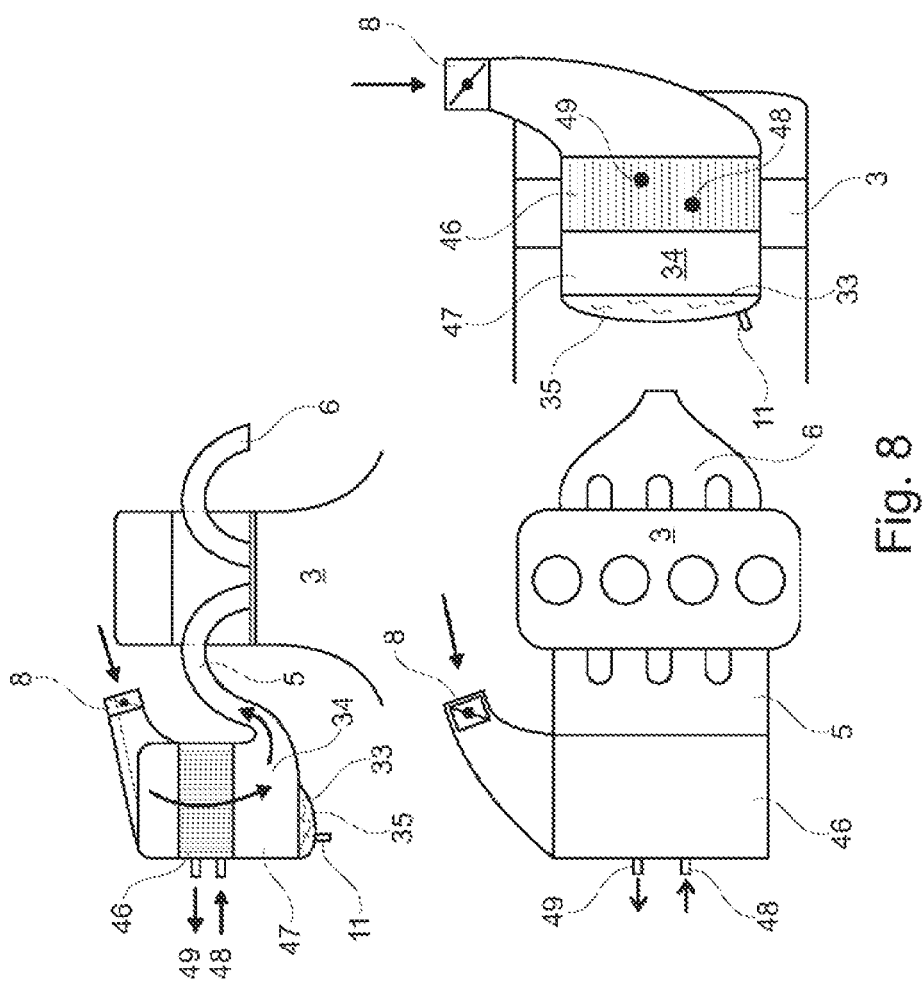
FIG. 8 shows two different side views and a plan view of a charge-air-cooler including a liquid collector integrated in an intake manifold.

FIG. 8 shows a first side view (upper view), a plan view (lower left view) and a second side view (lower right view) of an integrated charge-air-cooler 46 with a liquid collector 47 of a seventh exemplary embodiment of a turbocharger arrangement according to the invention which differs from the turbocharger arrangement 43 illustrated in FIG. 7 merely by the charge-air-cooler 46 and the liquid collector 47. The charge-air-cooler 46 and the liquid collector 47 are integrated into the intake manifold 5 and form a structural unit therewith. In one embodiment shown in FIG. 8, the charge-air-cooler 46 may be a water-cooled charge-air-cooler with a coolant inflow 48 and a coolant outflow 49. The internal combustion engine 3 is a four-cylinder in-line engine. Similarly to the situation in the liquid collector 37 shown in FIG. 4, the intake air flow indicated by corresponding arrows in FIG. 8 is diverted in the vicinity of the partition 33 of the liquid collector 47 such that the liquid droplets still remaining in the intake air after it flows through the charge-air-cooler 46 may be separated out in the liquid collector 47.

Figure 9:
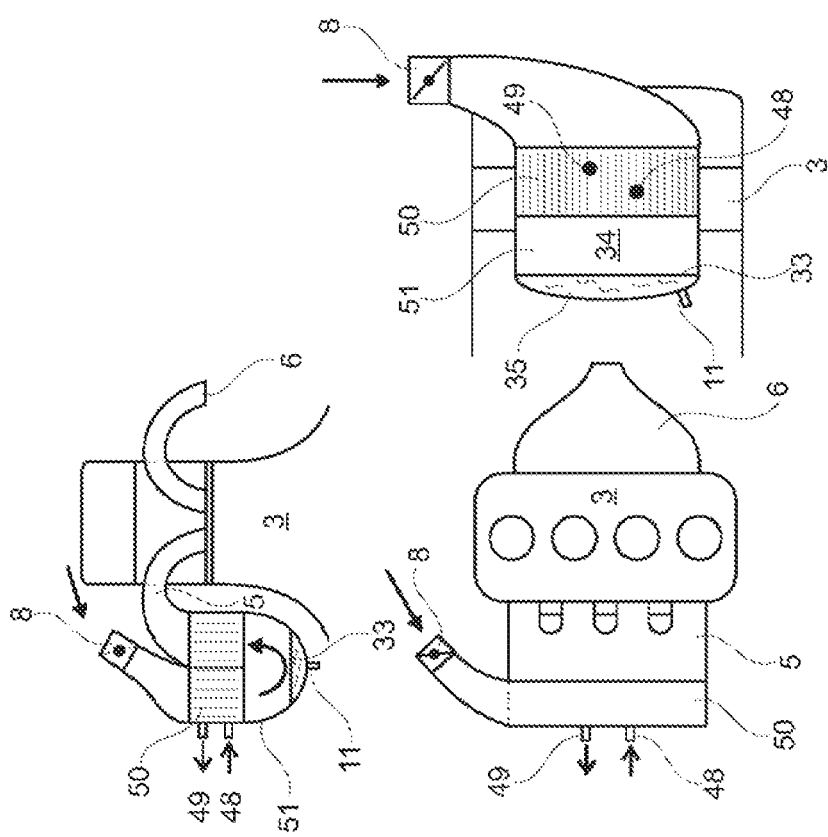
FIG. 9 shows two different side views and a plan view of a u-shape formed charge-air-cooler including a liquid collector integrated in an intake manifold.

FIG. 9 shows a first side view (upper view), a plan view (lower left view) and a second side view (lower right view) of an integrated, water-cooled charge-air-cooler 50 with a liquid collector 51 which differs from the turbocharger arrangement 43 illustrated in FIG. 7 merely by the charge-air-cooler 50 and the liquid collector 51. The charge-air-cooler 50 differs further from the charge-air-cooler 46 illustrated in FIG. 8 such that the charge-air-cooler 50 is of U-shaped form. As such, the intake air flowing through the charge-air-cooler may be cooled in the two straight U limbs and the liquid collector 51 is arranged in the U-shaped connecting region which connects the two straight U limbs to one another. In this case, the intake air flow may be diverted in the latter region in the vicinity of the partition 33 of the liquid collector 51.

FIG. 10 shows a front view (upper view) and a plan view (lower view) of an integrated, water-cooled charge-air-cooler 52 with a liquid collector 53 of a turbocharger which differs from the turbocharger arrangement 43 illustrated in FIG. 7 merely by the charge-air-cooler 52 and the liquid collector 53. The plan view (lower view) is illustrated without a charge-air-cooler 52. The internal combustion engine 3 illustrated in FIG. 10 is a V-configuration engine in which the charge-air-cooler 52, the liquid collector 53 and the intake manifold 5 are arranged in a central, upper intermediate space 54 between the cylinder heads of the internal combustion engine 3. As can be seen in the front view of FIG. 10, the intake manifold 5 may be formed in one ring-shaped pipe per cylinder of the internal combustion engine 3, by means of which pipes the intake air is, downstream of the charge-air-cooler 52, conducted with an approximately 360° rotation to the respective cylinders of the internal combustion engine 3. The liquid collector 53 is arranged at the lowest point of the ring-shaped intake manifold 5, wherein the ring-shaped intake pipes of the intake manifold 5 form the intake-air-conducting volume 34 of the liquid collector 53. The liquid-collecting volume 35 of the liquid collector 53 may be separated from said volume 34 by the partition 33.

In another embodiment, the liquid collector 10 and/or the valve 12 and/or the discharge line 13 can be heated by means of an electrical heater or by means of a coolant circulating in a coolant apparatus for cooling the internal combustion engine 3.

In another embodiment, the method according to the invention is used for discharging liquid, which is in particular a mixture of oil and water, from a turbocharger arrangement in a motor vehicle having an internal combustion engine, in particular Otto-cycle engine, that can be supercharged by means of at least one turbocharger and having a charge-air-cooler arranged between the turbocharger and the internal combustion engine. In a preferred embodiment, the turbocharger arrangement according to the invention is used in a motor vehicle.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for discharging liquid from an intake tract of a turbocharger arrangement which has an internal combustion engine, which can be supercharged by at least one turbocharger, and a charge-air-cooler which is arranged in the intake tract between the turbocharger and the internal combustion engine, comprising:
    collecting the liquid in a liquid collector, which has a liquid outlet which can be closed off by a switchable valve, downstream of the charge-air-cooler;
    performing the subsequent steps only if a temperature ($T_{coll}$) at the liquid collector is higher than a predetermined temperature threshold value ($T_{thres}$) and a pressure ($P_{coll}$) in the liquid collector is higher than a predetermined pressure threshold value ($P_{thres}$); determining an opening frequency (Freq) and an opening duration (Dur) for the valve;
    opening the valve;
    discharging the liquid from the liquid collector via a discharge line into a crankcase or an oil sump of the internal combustion engine;
    closing the valve after the predetermined opening duration (Dur); and
    repeating the above steps of determination, opening, discharging and closing with the predetermined opening frequency (Freq), and
    wherein the valve is open for the predetermined opening duration (Dur) even after shut-down of the internal combustion engine if the liquid collector is, in relation to gravity, arranged above an inlet point of the discharge line into the crankcase or into the oil sump of the internal combustion engine.

2. The method of claim 1, wherein the determination of the opening frequency (Freq) comprises a determination of the opening frequency (Freq) as a function of at least one pressure difference between the pressure ($P_{coll}$) in the liquid collector and a pressure ($P_{eng}$) in the crankcase or in the oil sump of the internal combustion engine and a temperature ($T_{eng}$) of the internal combustion engine.

3. The method of claim 1, wherein the determination of the opening duration (Dur) comprises a determination of the opening duration (Dur) as a function of at least the pressure ($P_{coll}$) in the liquid collector and the temperature ($T_{coll}$) at the liquid collector.

4. The method of claim 1, wherein the temperature ($T_{coll}$) at the liquid collector is determined by detecting ambient temperature or modeling liquid temperature in the liquid collector.

5. The method of claim 1, wherein a liquid level in the liquid collector is detected by a liquid level sensor and the opening frequency (Freq) is calculated additionally as a function of the detected liquid level.

6. The method of claim 1, wherein the liquid collector and/or the valve and/or the discharge line are heated if the temperature ($T_{coll}$) at the liquid collector is below the predetermined temperature threshold value ($T_{thres}$).

7. The method of claim 6, wherein the heating is performed electrically or by a coolant circulating in a coolant arrangement for cooling the internal combustion engine.

8. The method of claim 1, wherein the liquid collector forms an intake air outlet of the charge-air-cooler, the liquid collector an integral part of the charge-air-cooler.

9. The method of claim 1, wherein the liquid is a mixture of oil and water.

10. A method, comprising:
    collecting liquid in a liquid collector downstream of a charge-air-cooler; and
    responsive to an inter-related temperature and pressure at the collector, pulse-width-modulating a liquid outlet valve of the collector into a crankcase or oil sump of an engine, a frequency and pulse-width of the modulation adjusted responsive to a pressure difference between the liquid collector and the crankcase or sump.

11. The method of claim 10, wherein the frequency is increased as the pressure difference increases.

12. The method of claim 10, wherein the frequency is increased as temperature increases.

13. The method of claim 10, wherein a pulse-width opening duration is increased as pressure in the liquid collector increases and the temperature at the liquid collector increases.

14. The method of claim 10, further comprising adjusting the frequency based on a liquid level of liquid in the collector.

15. The method of claim 10, further comprising heating the liquid collector if the temperature at the collector falls below a threshold.

16. The method of claim 10, further comprising continuing the pulse-width-modulating even after a shut-down of the engine responsive to a road grade.

17. The method of claim 10, wherein the liquid is a mixture of oil and water.

18. A method, comprising:
collecting liquid in an engine intake collector downstream from a charge-air-cooler; and
responsive to an inter-related temperature and pressure at the collector, pulse-width-modulating a collector liquid outlet valve into a crankcase or oil sump of an engine, a frequency and pulse-width of the modulation adjusted responsive to a pressure difference between an intake and crankcase or sump, and heating the collector if the temperature at the collector falls below a threshold.

* * * * *